(12) United States Patent
Azizi et al.

(10) Patent No.: US 8,151,233 B1
(45) Date of Patent: Apr. 3, 2012

(54) CIRCUIT DESIGN WITH INCREMENTAL SIMULTANEOUS SWITCHING NOISE ANALYSIS

(75) Inventors: Navid Azizi, Markham (CA); Joshua David Fender, East York (CA)

(73) Assignee: Altera Corporation, San Jose, CA (US)

( * ) Notice: Subject to any disclaimer, the term of this patent is extended or adjusted under 35 U.S.C. 154(b) by 395 days.

(21) Appl. No.: 12/419,518

(22) Filed: Apr. 7, 2009

(51) Int. Cl.
*G06F 17/50* (2006.01)
(52) U.S. Cl. .......................... 716/115; 716/119; 716/122
(58) Field of Classification Search .................. 716/115, 716/119, 122, 124
See application file for complete search history.

(56) References Cited

U.S. PATENT DOCUMENTS

| | | | | |
|---|---|---|---|---|
| 4,609,834 | A * | 9/1986 | Gal | 326/26 |
| 6,564,355 | B1 * | 5/2003 | Smith et al. | 716/115 |
| 6,631,509 | B2 * | 10/2003 | Nakayama et al. | 716/122 |
| 7,299,444 | B1 * | 11/2007 | Tai et al. | 716/117 |
| 7,353,476 | B2 * | 4/2008 | Imada et al. | 716/112 |
| 7,412,673 | B1 * | 8/2008 | Duong | 716/115 |
| 7,523,430 | B1 * | 4/2009 | Patel | 716/115 |
| 7,788,620 | B1 * | 8/2010 | Xue et al. | 716/113 |
| 7,895,555 | B1 * | 2/2011 | West et al. | 716/108 |
| 7,949,977 | B2 * | 5/2011 | Kouzaki et al. | 716/115 |
| 2009/0150840 | A1 * | 6/2009 | Kousaki et al. | 716/5 |
| 2009/0172609 | A1 * | 7/2009 | Kousaki | 716/4 |

* cited by examiner

*Primary Examiner* — Stacy Whitmore
(74) *Attorney, Agent, or Firm* — Womble Carlyle Sandridge & Rice LLP

(57) ABSTRACT

Methods, computer programs, and systems for designing an electronic component are presented. One method calculates a first Simultaneous Switching Noise (SSN) on Input/Output (IO) pins using a first configuration of the electronic component. A setting or a placement of a chosen IO pin is changed to obtain a second configuration of the electronic component, and a second SSN on IO pins is obtained based on the results of the first SSN and based on new SSN calculations related to the changed setting or placement. The second SSN on an IO pin, other than the chosen IO pin, is calculated by subtracting from the first SSN on the IO pin the SSN caused by the chosen IO pin calculated in the first SSN, and by adding an incremental SSN caused by the chosen IO pin on the pin in the second configuration. The method further includes the operation of creating a design for the electronic component with either the first or the second configuration based on the results of the first and the second SSN.

20 Claims, 9 Drawing Sheets

CIRCUIT DESIGN WITH INCREMENTAL SIMULTANEOUS SWITCHING NOISE ANALYSIS

CROSS REFERENCE TO RELATED APPLICATIONS

This application is related to U.S. patent application Ser. No. 12/034,400, filed on Feb. 20, 2008, and entitled "Simultaneous Switching Noise Analysis Using Superposition Techniques", which is incorporated herein by reference.

BACKGROUND

Simultaneous switching noise (SSN) is defined as a noise voltage induced onto a single victim Input/Output (I/O) pin of an electronic component due to the switching behavior of other aggressor I/O pins in the device. This noise is considered in the context of either an output I/O driver victim or an input I/O buffer victim. Noise injected onto the pin of an output buffer will be attenuated by the effects on the connected transmission line, termination network, and receiver load. The shape of this noise pulse at the receiver, the far-end, is critical when considering SSN effects on output buffers. This far-end pulse can cause timing and voltage level errors. In the case of noise induced onto an input pin, there is no transmission line noise attenuation to consider. However, the noise, directly sampled by the near-end input buffer, can still cause timing and voltage level errors.

As the complexity and size of Integrated Circuits (ICs) grows, so does the amount of time required to perform SSN analysis on a circuit design, which can be in the order of hours or days. In practice, this translates in a limit to the number of possible IO configurations that a circuit designer can test using SSN techniques.

It is in this context that embodiments of the invention arise.

SUMMARY

Embodiments of the present invention provide methods, computer programs, and systems for designing an electronic component. It should be appreciated that the present invention can be implemented in numerous ways, such as a process, an apparatus, a system, a device or a method on a computer readable medium. Several inventive embodiments of the present invention are described below.

In one embodiment, an operation of a method calculates a first Simultaneous Switching Noise (SSN) on Input/Output (IO) pins using a first configuration of the electronic component. A setting or a placement of a chosen IO pin is changed to obtain a second configuration of the electronic component, and a second SSN on IO pins is obtained based on the results of the first SSN and based on new SSN calculations related to the changed setting or placement. The second SSN on an IO pin, other than the chosen IO pin, is calculated by subtracting from the first SSN on the IO pin the SSN caused by the chosen IO pin calculated in the first SSN, and by adding an incremental SSN caused by the chosen IO pin on the pin in the second configuration. The method further includes the operation of creating a design for the electronic component with either the first or the second configuration based on the results of the first and the second SSN.

In another embodiment, a computer program for designing an integrated circuit (IC) includes program instructions for calculating a first SSN on IO pins of the IC. In addition, the computer program selects an IO pin for changing the IO pin placement, and calculates a new SSN on IO pins based on the changed placement of the IO pin and the first SSN. Further yet, the computer program tracks the amount of error introduced in the new SSN calculated based on the results from the first SSN. The computer program is able to repeat the operations of changing placement of one of the IO pins and calculating a new SSN until a design criteria is met or until the maximum amount of error is reached. The computer program creates a design for the IC by selecting the best SSN from all the calculated SSNs.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, computer programs, and systems for designing an electronic component. Typical SSN computer-based analyses have long runtimes that make them unsuitable for real-time feedback. Embodiments of the invention describe fast SSN analysis using the results of previous SSN analysis along with some new simulations to obtain a new estimate of the SSN. Optimizing a design for SSN involves manual changes to the design's pin locations and IO standards. For this manual optimization to be feasible, a circuit designer requires quick SSN results to be able to test a number of changes to the design in a short amount of time. Existing solutions for obtaining SSN use a complete device analysis, which is not appropriate for analyzing small changes.

In one embodiment, a method is used to obtain quick SSN results after changes in pins setting or location. The method uses results obtained from previous SSN analyses and a limited number of new simulations to obtain an estimate for the SSN on a pin quickly. The method allows for a manual and incremental SSN optimization by a circuit designer.

It will be obvious, however, to one skilled in the art, that the present invention may be practiced without some or all of these specific details. In other instances, well known process operations have not been described in detail in order not to unnecessarily obscure the present invention.

Figure 1:
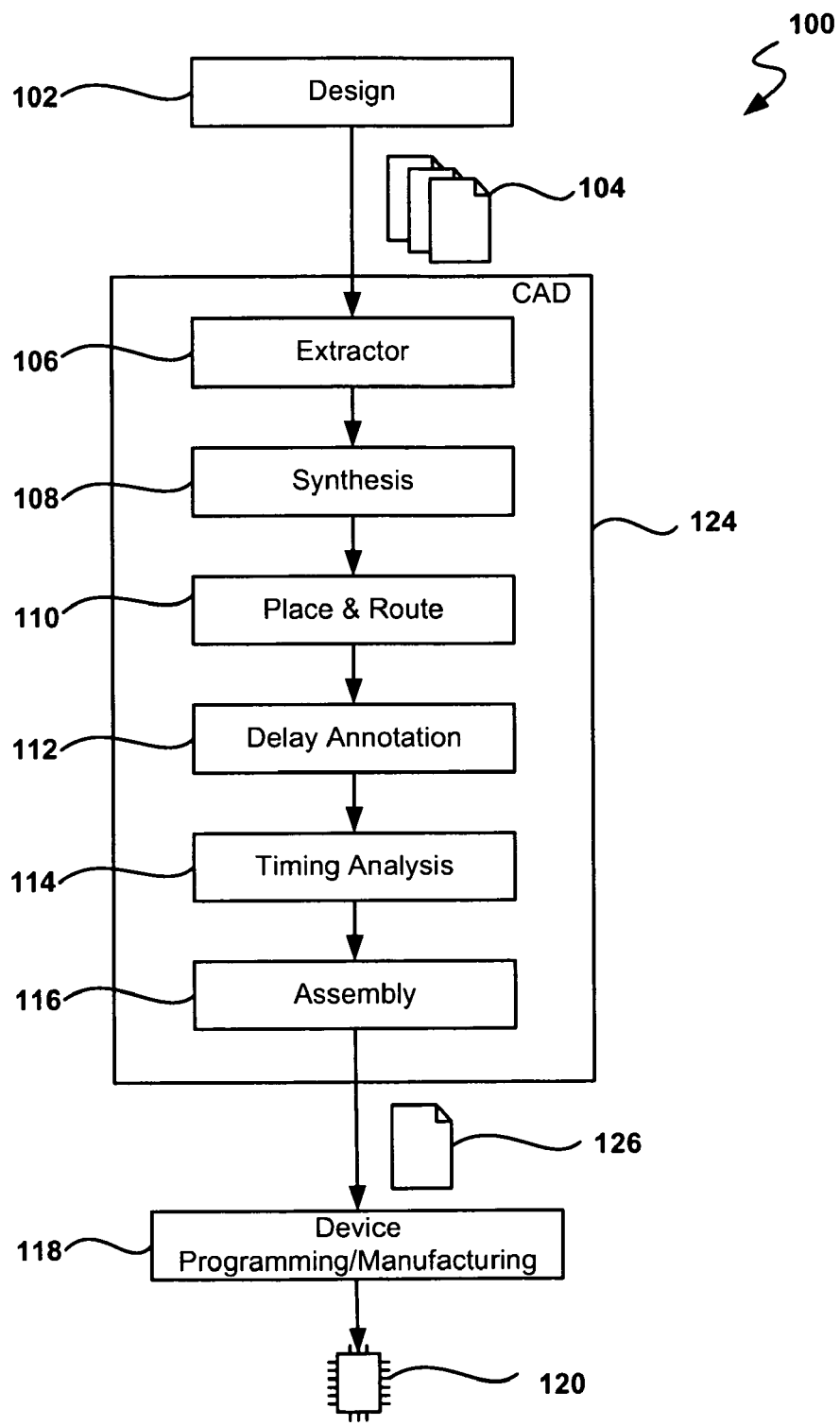
FIG. 1 depicts the method operations required to program or manufacture an Integrated Circuit (IC) using a Computer Aided Design (CAD) tool in accordance with one embodiment of the invention.

FIG. 1 depicts the method operations required to program or manufacture an Integrated Circuit (IC) using a Computer Aided Design (CAD) tool 124. The process starts with design 102 produced by a hardware engineer that creates HDL files 104 containing the desired circuitry description. Initially, extractor 106 parses HDL files 104 and creates a basic discrete netlist of logic-gate primitives, followed by synthesis 108 phase that optimizes the basic netlist.

The sequence of steps is designed for a typical user, that is, one size fits all. Synthesis design engineers must trade off goals when selecting synthesis algorithms to run. Firstly, the desired solution must have a small area thereby requiring minimizing the number of technology cells used resulting in a less costly electronic device. Secondly, the speed of the resulting circuit needs to satisfy the user timing constraints. Finally, the runtime of the synthesis tool must be long enough to produce acceptable solutions, but not so long as to be non-productive for the hardware engineer awaiting a solution. For example, a reasonable amount of time for synthesis in current designs is about one hour, but can increase to several days depending on requirements.

Place and route 110 and assembly 116 operations follow synthesis 108. After place and route 110, delay annotation 112 assigns delays to the different gates and wires in the circuit. Timing analysis computes the lengths of paths in the circuits and how the delays relate to the constraints of the circuit. As a result, CAD tool 124 produces binary file 126 with a description of the circuit to be used during device programming/manufacturing 118 of IC 120. The resulting binary file 126 can be stored in non-volatile memory for later retrieval by the device programming or manufacturing process 118. IC 120 is created during the device programming or manufacturing process 118 according to the instructions in design binary file 126. One skilled in the art will appreciate that any commercially available electronic design automation (EDA) tool may utilize the embodiments described herein.

Figure 2:
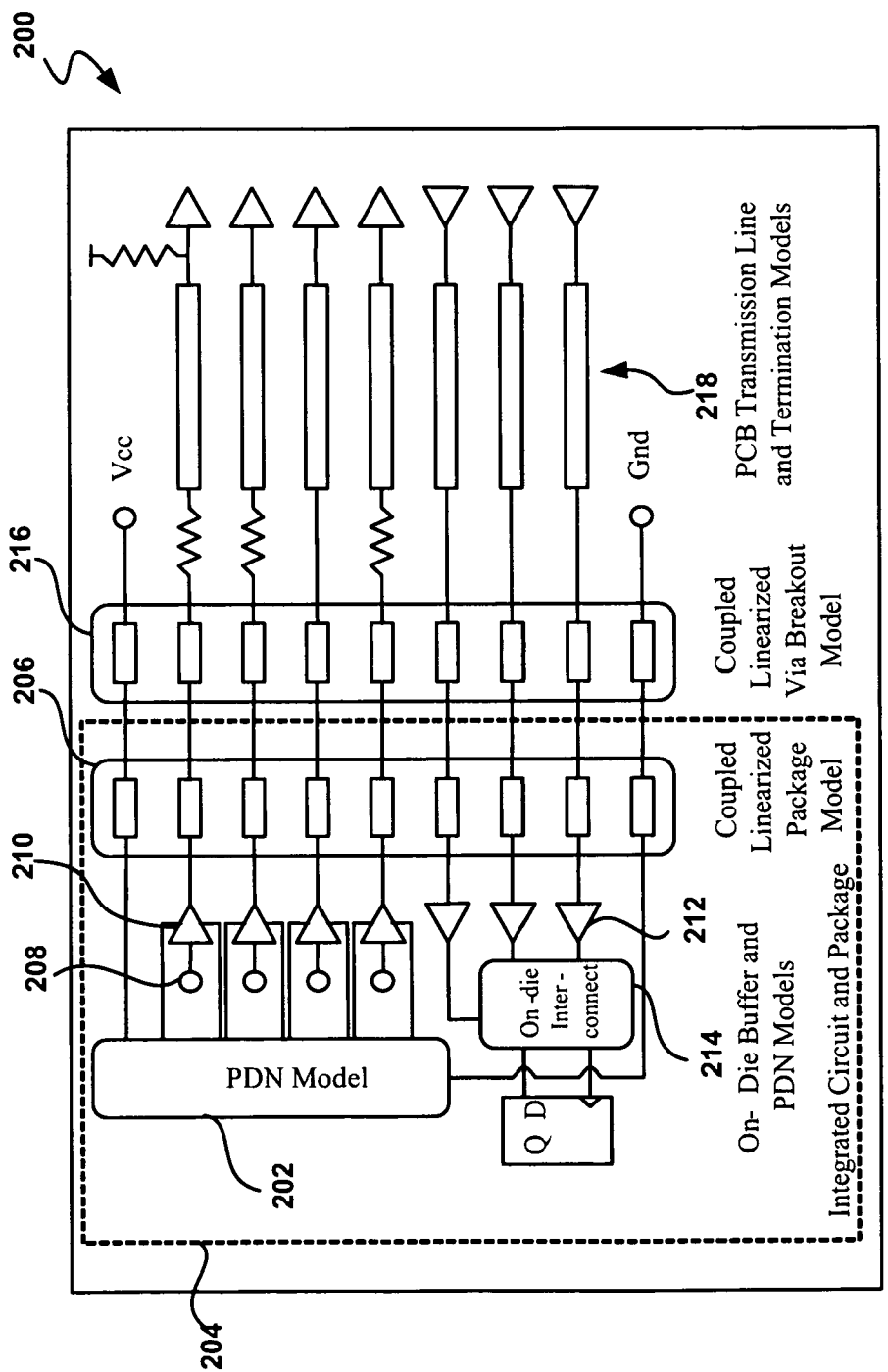
FIG. 2 shows a typical electrical model suitable for SSN simulation according to one embodiment.

FIG. 2 shows a typical electrical model suitable for SSN simulation according to one embodiment. This topology illustrates the different elements that need to be modeled without specifying the exact form of the underlying model. The linear superposition method of SSN simulation is not limited to this topology, but this topology is assumed for discussion purposes. For more details on the linear superposition model, check U.S. application Ser. No. 12/034,400, filed on Feb. 20, 2008, and entitled "Simultaneous Switching Noise Analysis Using Superposition Techniques," which is incorporated herein by reference. This Application describes methods that allow the SSN on a victim pin to be calculated through the superposition of many short simulations, each composed of a single aggressor pin switching. This method of determining the SSN on one victim pin allows the reuse of simulations to determine the SSN on various victim pins. This causes a reduction in computation time when determining the SSN on all pins in the design compared to performing full SSN analysis on each victim pin (order of tens of minutes to hours instead of order of days). This type of analysis can be used effectively as a signoff SSN analysis.

The entire signal and power paths of I/O signals are modeled during SSN calculations, both leaving and coming into an integrated circuit of interest. On the left side of FIG. 2, a model for the integrated circuit of interest is presented, and on the right side of FIG. 2, a model of the Printed Circuit Board (PCB) and the off chip I/O buffers is shown. The integrated circuit 204 model consists of both input buffers 212 and output buffers 210. These buffers are connected to the Printed Circuit Board (PCB) through a coupled package model 206. This model is designed to include coupling between signals including return path effects. Each I/O buffer is connected to a Power Distribution Network (PDN) model 202. The purpose of PDN model 202 is to capture any PDN non-idealities that might cause noise. The final piece of the model is an on-die interconnect 214 model. This model is intended to capture any filtering effects that are present on the path between an input buffer and an internal register that eventually samples the input data.

The PCB model consists of a coupled via region breakout model 216 connected to signal transmission lines 218, termination networks, and I/O buffers. The via breakout model is important as the vertical signal path component, below the integrated circuit package, can significantly contribute to SSN noise. As drawn, the model assumes ideal ground return path and no coupling between transmission lines. This is not a requirement for the linear superposition method but rather a simplification to make the discussion easier.

The attenuation effects of a termination network and signal path connected to the victim pin causes the amount of SSN to vary along the different points of the signal path. In one embodiment, the SSN measurement of interest will be defined as the amount of noise voltage measured at the far-end of the signal trace driven by the victim pin. This is called a far-end SSN measurement. Modeling the SSN behavior of a device is difficult in general. This problem of modeling SSN behavior becomes more complex when analyzing a Programmable Logic Device (PLD), such as an Field-Programmable Gate Array (FPGA), due to the support of numerous I/O standards, modes, and drive strengths.

Figure 3A:
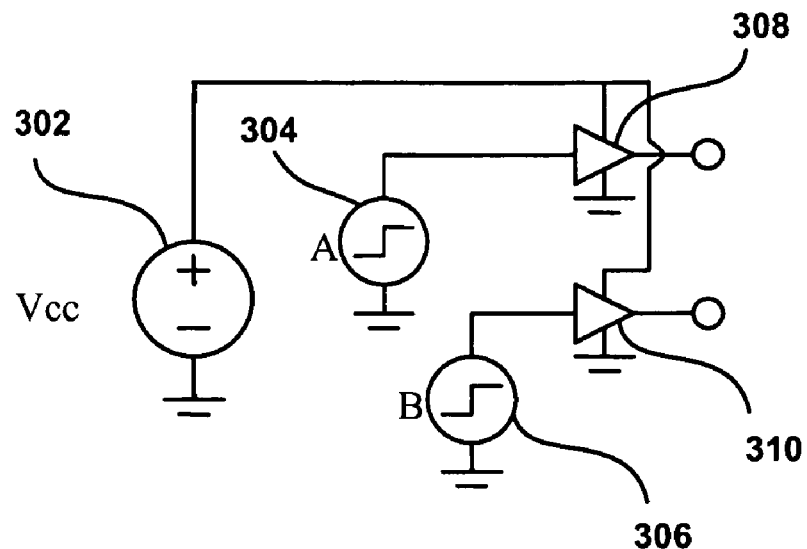
FIGS. 3A-B depict one embodiment for SSN simulation using extended linear superposition.
Figure 3B:
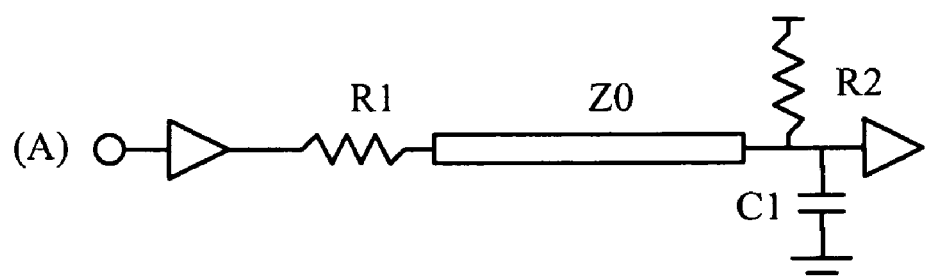

FIGS. 3A-B depict one embodiment for SSN simulation using extended linear superposition. The typical SSN model, such as the one shown in FIG. 2, is not a linear system. Different methods can be used to linearize most of the SSN model components to linear equivalents. The coupled package and via models, PDN, interconnect model, and PCB transmission lines can all be modeled using linear circuit elements with little loss in accuracy. For the purpose of this discussion all these elements are assumed to be linear, either by design or through linearization techniques. This leaves only the I/O buffers themselves as non-linear devices.

The most naïve way to apply linear superposition techniques to this system is to simply apply the methodology assuming that the system is in fact linear. The amount of error that will result from this naïve approach is directly related to how non-linear the system is. Unfortunately, I/O buffers are extremely non-linear, meaning that this method does not work at all. The primary non-linearity of I/O buffers comes from the embedded non-linear transistors and in particular to the gate to source voltage. For output buffers, this voltage is related to a Direct Current (DC) I/O supply rail. Standard linear superposition techniques would force this voltage to zero, effectively putting the I/O buffer transistors into cut-off, a state not linearly related to the typical operating range of I/O buffer transistors. In order to avoid putting the I/O transistors into cut-off, the linear superposition methodology must be extended to allow some supplies to remain nonzero.

The basic idea behind using linear superposition techniques to simulate SSN is to allow the supply voltages to remain nonzero while applying superposition only to the transitioning buffers themselves. By leaving the supply voltage nonzero, the I/O buffers are correctly biased and behave reasonably linearly. This solution solves the non-linearity problem but now causes these non-zero supplies to be counted multiple times. FIG. 3A shows a simple circuit that can be used to illustrate the non-zero supply double counting problem. The circuit models two output buffers 308 and 310, both connected to power supply Vcc 302 and controlled by step stimulus sources A 304 and B 306. Standard linear superposition techniques would perform three simulations, one for each supply, and add the results. The equation below summarizes that linear superposition can not be used by just adding the individual responses for the different sources acting alone.

$$\text{response}(Vcc+A+B) \neq \text{response}(Vcc) + \text{response}(A) + \text{response}(B)$$

As indicated above, this method does not work because the I/O buffers only behave linearly if Vcc is nonzero. The solution to this problem is to perform one simulation with A and Vcc, another one with B and Vcc, and then a third one with Vcc alone. The resulting response is calculated according to the following formula:

$$\text{response}(Vcc+A+B) = \text{response}(Vcc+A) + \text{response}(Vcc+B) - \text{response}(Vcc)$$

The equation shown above is valid under the linear superposition assumption and also insures that the output buffers are in their linear regions since Vcc is never zero. This approach allows SSN simulations of multiple aggressors to be performed independently while correctly biasing the non-linear devices. It should be noted that the method described above implicitly assumes that the victim buffers are all driving low. The reason for this is that the step stimulus sources A and B are forced to zero while not acting as aggressors. The method above can be extended to support victims driving high as follows:

$$\text{response}(Vcc+A+B) = \text{response}(Vcc+A+B\text{high}) + \text{response}(Vcc+B+A\text{high}) - \text{response}(Vcc+B\text{high}+A\text{high})$$

The correct summation of supplies is calculated while biasing the desired stimulus nodes to the correct value. Further improvements in SSN simulations can be gained by modifying the individual simulations required for applying linear superposition. The first method, board transmission line decoupling, applies to all types of SSN simulations, both complete simulations and superposition simulations. The second method applies only to the superposition method and involves replacing victim buffer models with simplified linear models. FIG. 3B depicts a model of a transmission line, according to one embodiment. The model for the transmission line includes resistor R1, line impedance Z0, resistor R2, and capacitive load C1.

For users that are in the midst of creating an FPGA design, and for which the pin placements have not been finalized, the above full-signoff SSN analysis can be burdensome if used iteratively to determine appropriate I/O pin settings and placements. For each change in an I/O pin setting or placement, a full-signoff SSN analysis would need to occur, taking on the order of tens of minutes, thus limiting the amount of iteration that a user can perform to optimize a design.

In one embodiment, the SSN analysis engine attempts to reuse as much of the old simulation results as possible, and only performs a small number of short simulations to account for the changes in the design. In this formulation, the SSN analysis makes some approximations to be able to reuse as much of the old simulation results to obtain a new SSN estimate of the pins in a design when an I/O pin setting or location is changed. Because of the approximations, the analysis may lose some accuracy, but the tradeoff is the achievement of adequate results within seconds, thus allowing the user to iteratively optimize the design. Once the optimization has been iteratively completed by the user, a full signoff SSN analysis can be run to obtain more accurate SSN results.

Figure 4A:
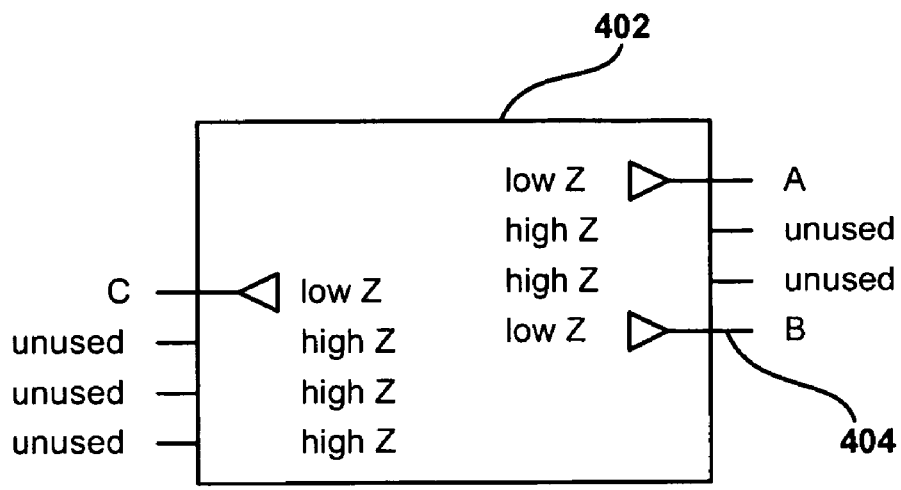
FIGS. 4A-B illustrate different embodiments of ICs with different IO pin configurations.
Figure 4B:
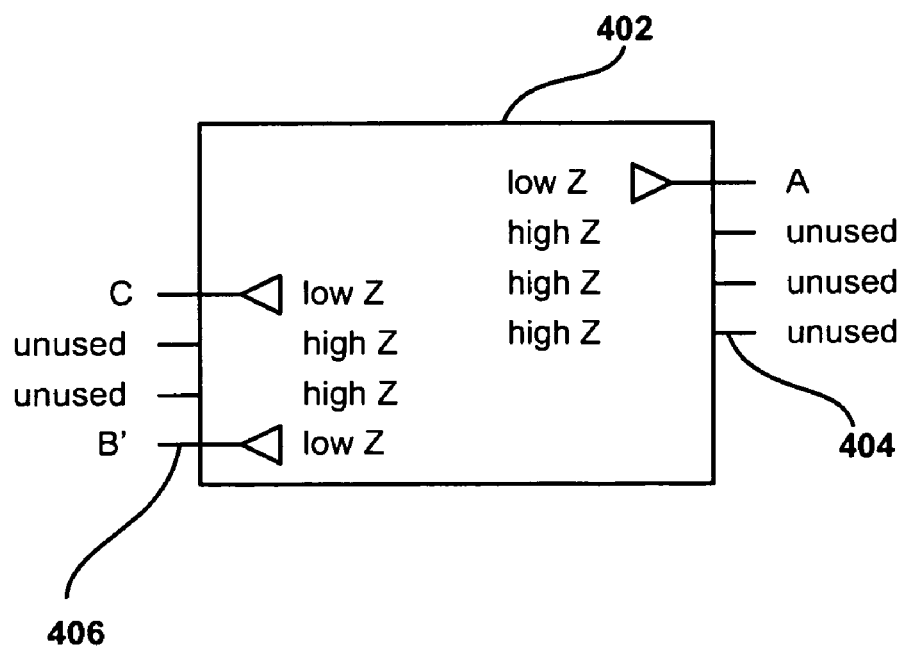

FIGS. 4A-B illustrate different embodiments of ICs with different I/O pin configurations. One factor when reusing SSN calculations arises when a buffer's setting on a particular pin is changed such that the impedance of the buffer also changes with respect to the impedance before the buffer's setting was changed. The amount of noise injected on the pin from the previously stored simulations will be different after the impedance change. Generally, the higher the victim pin impedance, the lower the amount of noise that is injected onto the far-end by aggressor pins. In one sample configuration, as seen in FIG. 4A, pins A, B, and C are configured as I/O buffers in IC 402. Pins A, B, and C present low impedance Z, while the other unused buffers present high impedance Z.

If pin B is moved from location 404 to a new location 406 (referred to as B'), the resulting pin configuration is the one shown in FIG. 4B. B' now presents a low impedance, while the same pin 406 presented high impedance previously. Similarly, the pin previously used by B has also change to present a high impedance. This impedance change for the pin moved must be accounted for, or at least the error derived from the change tracked, in order to produce reliable SSN's based on previous SSN calculations. In some cases, this impedance change for the pin moved can be compensated by a scaling of the stored waveforms by a ratio of the buffer's original and new impedance, as discussed below.

Effective SSN optimization requires close-loop feedback on the effect of any optimization change. This loop closure depends on the existence of an accurate SSN model that can evaluate a proposed SSN optimization. Unfortunately, many SSN models have runtimes that make them unsuitable for real-time feedback or optimization. In one embodiment, one method analyzes the SSN performance of a design and proposes multiple SSN optimizations based on the results of the initial SSN estimation. After a number of optimizations, the method determines that a maximum amount of error has been reached and a new full SSN analysis is performed in the resulting design. The result is achieved with increased speed, due to the avoidance of having to perform a full analysis of each proposed SSN optimization. In one embodiment, the intermediate SSN estimates provide limited information on SSN for all pins, that is, some of the pins may have an unknown amount of estimated SSN.

In another embodiment, a fast, and possibly less accurate, SSN analysis estimate is obtained after each proposed SSN optimization. This provides quick information to guide optimization but the information margin of error is higher than with a complete SSN analysis.

As previously discussed, performing SSN simulations using linear superposition requires multiple simulations in which only one aggressor is toggling. During each of these simulations all other output buffers are driving either a DC high or DC low voltage. The waveform from which the final SSN is obtained on a victim pin is computed through the addition of multiple constituent waveforms which consist of one aggressor buffer switching, while all other buffers remain quiet. The previously discussed linear superposition equation, where response(Vcc+A+B) is the sum of the response (Vcc+A) and the response(Vcc+B) minus the response(Vcc), can be expressed using waveforms. The following waveform equation shows how the final waveform is computed:

$$w_v = W_{DC} + \sum_{agg} (W_{agg} - W_{agg}(t=0))$$

$W_V$ is the final victim waveform, $W_{DC}$ is a waveform obtained from a DC simulation performed with all buffers being quiet to determine the initial values of the final waveform, $W_{agg}$ is the waveform obtained on the victim when a specific aggressor buffer is switching, and $W_{agg}$ (t=0) is the value of $W_{agg}$ at time 0. The value at time 0 is subtracted so that only the noisy portion of the waveform is superimposed and there is no DC offset as part of the extended linear superposition algorithm. An iterative SSN analysis takes advantage of the linear superposition to allow for a few extra simple simulations to approximately determine the SSN on pins which have moved or that have had their properties changed.

After the full signoff SSN analysis is originally run, the SSN backend will have all the constituent superposition simulations stored. These stored simulations allow the incremental SSN analysis to quickly determine the SSN on the pins in the design when a subset of the pins are moved or changed. When a pin is moved, or the pin's properties are changed, the new SSN on the pins in the design is obtained by subtracting the SSN from a constituent simulation representing the old state of the pin which has been moved or changed, and by adding the SSN from a constituent simulation representing the new state of the pin which has been moved or changed. The constituent simulation of the old state was performed when the original full signoff SSN analysis was run and the results and intermediate computations were stored. Thus, only one new constituent simulation representing the new state of the pin which has moved or changed needs to be performed, which takes a short amount of time, such as in the order of a few seconds for one embodiment.

An example describes performing incremental SSN analysis in an IC with three I/O pins. A full signoff SSN analysis is performed on the three pins, A, B, and C. The SSN on each pin is represented as:

$$W_{A\_SSN} = W_{A\_DC} + (W_{A\_Bagg} - W_{A\_Bagg}(t=0)) + (W_{A\_Cagg} - W_{A\_Cagg}(t=0))$$

$$W_{B\_SSN} = W_{B\_DC} + (W_{B\_Aagg} - W_{B\_Aagg}(t=0)) + (W_{B\_Cagg} - W_{B\_Cagg}(t=0))$$

$$W_{C\_SSN} = W_{C\_DC} + (W_{C\_Aagg} - W_{C\_Aagg}(t=0)) + (W_{C\_Bagg} - W_{C\_Bagg}(t=0))$$

$W_{X\_Yagg}$ represents the waveform of pin X obtained from a simulation when pin Y is the aggressor. It should be noted that that to obtain all the above waveforms three DC (very short) and three transient simulations are needed to represent the cases where pins A, B and C are the aggressors. Subsequently, pin B is moved to a different location. If the full signoff analysis flow were run, the SSN would be computed as follows:

$$W_{A\_SSN\_NEW} = W_{A\_DC} + (W_{A\_B'agg} - W_{A\_B'agg}(t=0)) + (W_{A\_Cagg} - W_{A\_Cagg}(t=0))$$

$$W_{B'\_SSN\_NEW} = W_{B'\_DC} + (W_{B'\_Aagg} - W_{B'\_Aagg}(t=0)) + (W_{B'\_Cagg} - W_{B'\_Cagg}(t=0))$$

$$W_{C\_SSN\_NEW} = W_{C\_DC} + (W_{C\_Aagg} - W_{C\_Aagg}(t=0)) + (W_{C\_B'agg} - W_{C\_B'agg}(t=0))$$

The new location for B has been named B', thus B as been replaced with B' in the equations. A full SSN analysis would require three DC and three transient simulations. However, if the SSN analysis backend still has the stored results of the first set of SSN results, then the interactive SSN analysis obtains the new SSN results by performing the following transformation:

$$W_{A\_SSN\_NEW} = W_{A\_SSN} - (W_{A\_Bagg} - W_{A\_Bagg}(t=0)) + (W_{A\_B'agg} - W_{A\_B'agg}(t=0))$$

$$W_{B'\_SSN\_NEW} = W_{B'\_DC} + (W_{B'\_Aagg} - W_{B'\_Aagg}(t=0)) + (W_{B'\_Cagg} - W_{B'\_Cagg}(t=0))$$

$$W_{C\_SSN\_NEW} = W_{C\_SSN} - (W_{C\_Bagg} - W_{C\_Bagg}(t=0)) + (W_{C\_B'agg} - W_{C\_B'agg}(t=0))$$

The calculation of the SSN on pins A and C begins with the waveforms obtained from the original full signoff-analysis. Then, the waveform when B is the aggressor in the original state is subtracted, and the waveform when B' is the aggressor in the new state is added. In this case, only one additional transient simulation is needed.

For the new SSN on pin B', a short DC simulation is performed, and the previously performed simulations when pins A and C are aggressors are used to determine the SSN. Generally, only one additional DC and transient simulation is needed, such as the case when pin B is at a new location or has new settings.

In the case of a larger system where there are n pins, the benefits of this type of algorithm, where one stored simulation result is subtracted, and another simulation result is added to the old SSN result to obtain a new SSN, become even larger. The reason is that in this algorithm the number of extra transient simulations needed remains at 1. However, a full signoff SSN analysis would require n extra transient simulations. Furthermore, this type of algorithm can be performed in a succession of changes or moves to obtain incremental and new SSN results, allowing the user to optimize a design faster.

In one embodiment, one additional operation is performed to improve the accuracy of the results. If a buffer's setting on a particular pin is changed such that the impedance of the buffer changes, the amount of noise injected on the pin from the previously stored simulations will be different, as previously discussed with respect to FIGS. 4A-B. Generally, the higher the victim pin impedance, the lower the amount of noise that is injected onto the far-end by aggressor pins. This change in impedance can be compensated by scaling the stored waveforms by the ratio of the buffer's original impedance to the buffer's new impedance. For more details on scaling in SSN analysis, check U.S. application Ser. No. 11/877,072, filed Oct. 23, 2007, and entitled "Method and System for Analyzing Input/Output Simultaneous Switching Noise."

New SSN values for pins which are moved to locations which were previously unused cannot be obtained easily due to the large change of the pin location's impedance. The unused locations have impedances in the original full signoff SSN analysis that are either very large or very small. Thus, the noise on those pins is not indicative of the noise on that pin when the pin has an intermediate impedance. In this case, a full signoff SSN analysis needs to occur to obtain the SSN at the new location. However, while an SSN value can not accurately be obtained on the pin in the new location, the SSN values for all other pins in the design can be updated to include the noise from the pin in the new location and discounting the old noise. The SSN results for most pins would be available to the user allowing the user to continue optimizing the design for SSN. In one embodiment, scaling is used to obtain an estimate of SSN on the pins moved in order to calculate the SSN for all the pins in the design.

Figure 5:
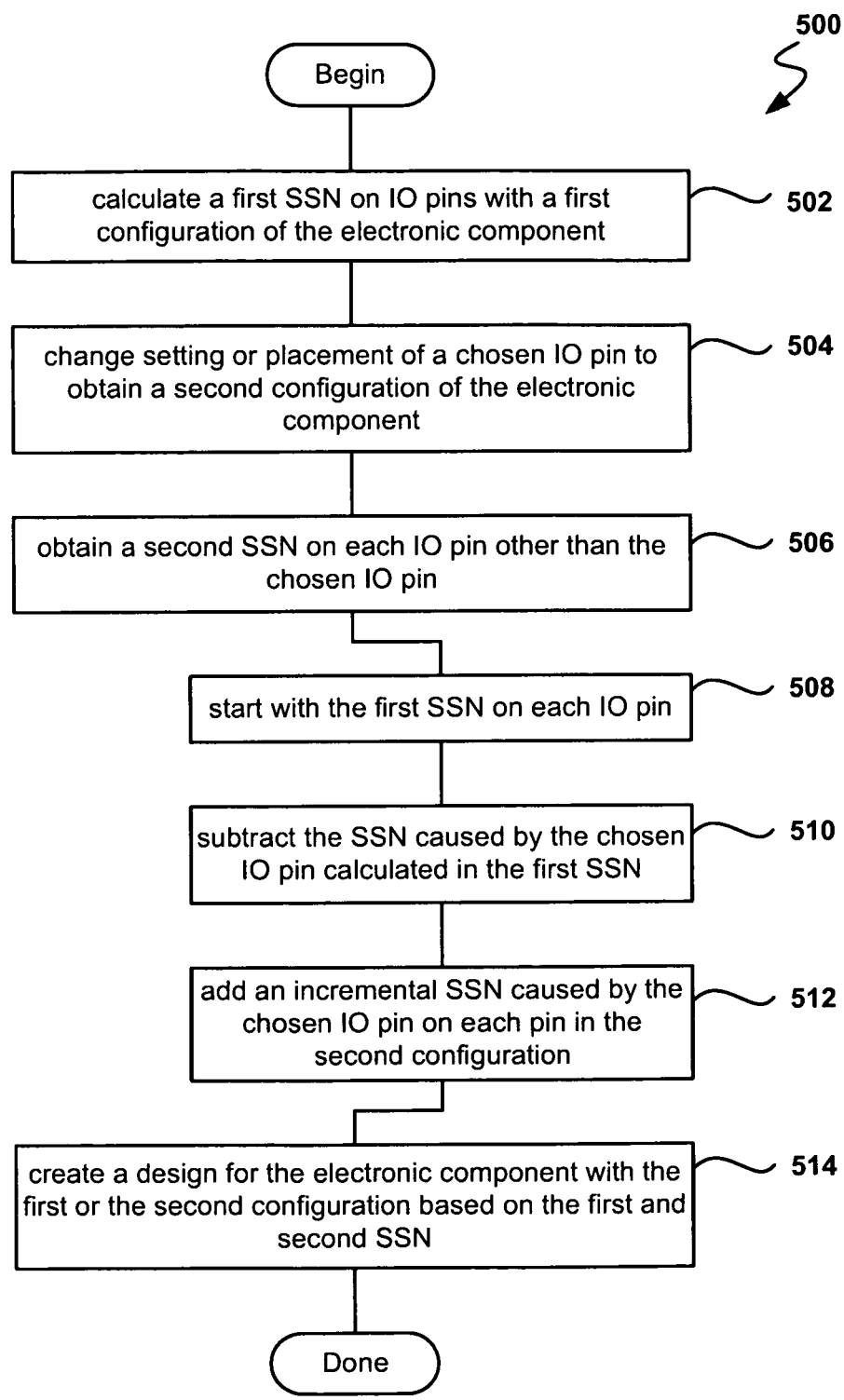
FIG. 5 includes a flow chart for an embodiment to calculate incremental SSN.

FIG. 5 includes flow chart 500 for an embodiment to calculate incremental SSN. In operation 502, a first SSN is calculated on IO pins with a first configuration of an electronic component. In one embodiment, the first SSN uses linear superposition methods as previously discussed in reference to FIGS. 2-4B. A second configuration of the electronic component is obtained in operation 504 by changing the setting or the placement of a chosen IO pin. In operation 506, the method obtains a second SSN on each IO pin other than the chosen IO pin. The obtaining of the second SSN is further detailed in operations 508, 510, and 512. Thus, in operation 508, the second SSN on a pin starts with the first SSN on the pin previously calculated in operation 502. In operation 510, the SSN caused by the chosen IO pin, which was previously calculated in the first SSN, is subtracted, and in operation 512, the incremental SSN caused by the chosen IO pin on each pin in the second configuration is added.

In operation 514, the best design from the first or the second configuration is chosen based on which configuration results in better SSN, and a design for the electronic component is created with the best design.

The algorithm covered in flow chart 500 includes some approximations in the computation of SSN, as previously described. In addition, the SSN injected on a victim pin is not solely a function of the aggressor pin, but also of the impedance of third-party pins, which are considered to remain unchanged during superposition simulations. Specifically, the higher the impedance of third-party pins, the more noise is injected from the aggressor pin to the victim pin.

In the incremental SSN analysis, the constituent simulations used to determine the new SSN on pins will have set the impedance of some of their third-party pins incorrectly, and thus the SSN result obtained will not be totally accurate. Using the example previously described in reference to FIGS. 4A and 4B where pin B has moved to a new location B', when calculating the new SSN for pin A the constituent simulation which determines the amount of noise injected onto pin A when pin C switches uses the impedance of pin B in location 404, and uses the impedance of an unused pin in location 406. In reality, however, location 404 should have the impedance of an unused pin, and location 406 should have the impedance of pin B'.

However, if there are many pins in a design the change in impedance of a single pin does not greatly affect the total SSN, and the method described above gives a close result that is appropriate for an interactive session when a user wants to test new pin placements and obtain quick results. In one embodiment, the amount of inaccuracy or error introduced in incremental SSNs is limited to a predefined maximum. The maximum amount of error can be tracked in different ways. In one embodiment, the incremental SSN analysis limits the number of changes that can occur before asking the user to perform a full signoff SSN analysis. The maximum number of changes allowed is a function of the method used for tracking the error introduced through the incremental analysis. Possible methods for tracking error include monitoring the magnitude of noise change, the number of aggressor pins, the distance of the aggressor pins, the IO standards used, etc. The optimal method for tracking this error and limiting the number of changes can also depends on the underlying device.

Figure 6:
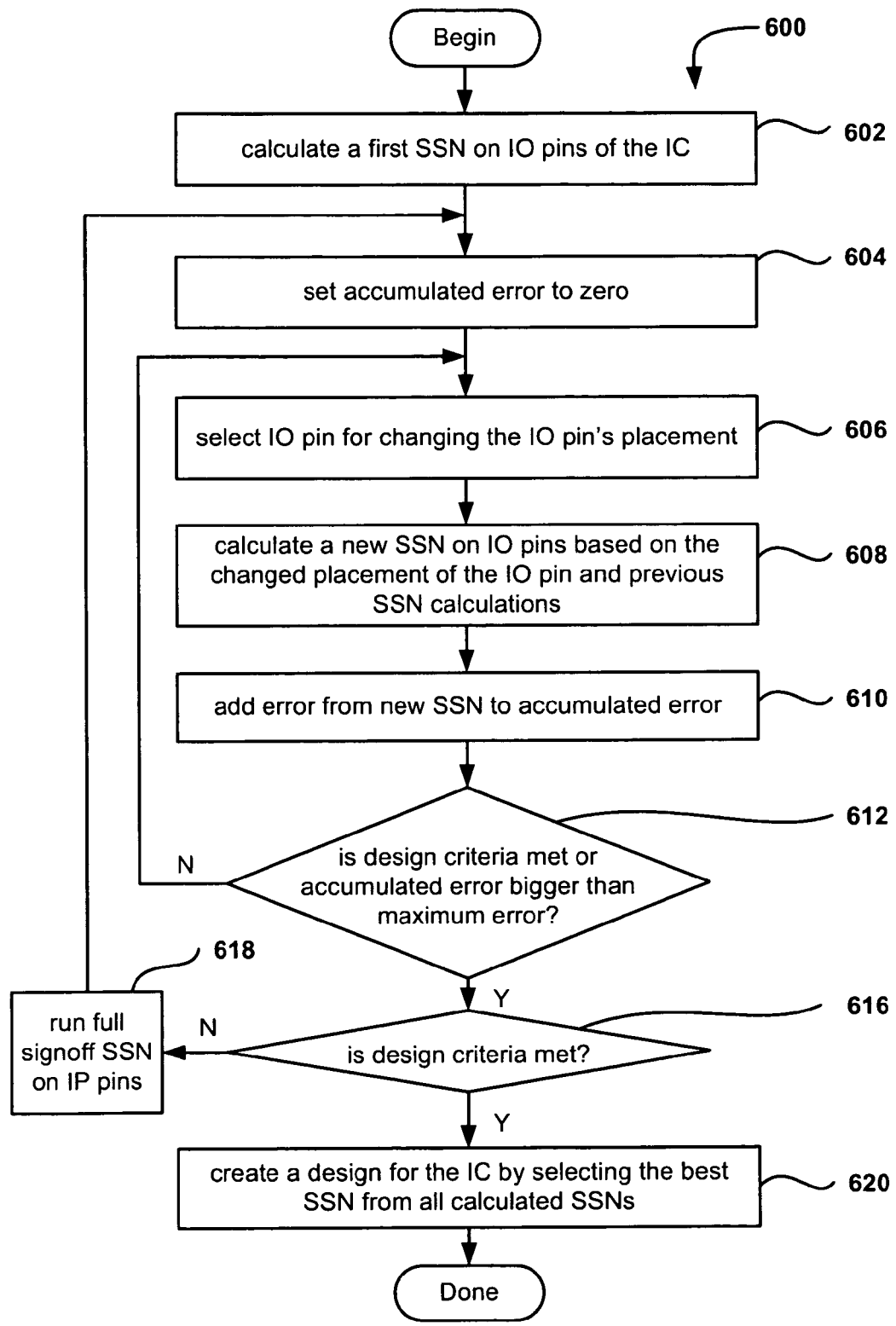
FIG. 6 illustrates a flow chart for performing successive incremental SSN calculations in accordance with one embodiment.

FIG. 6 illustrates flow chart 600 for performing successive incremental SSN calculations in accordance with one embodiment. In operation 602, a first SSN on IO pins is calculated using linear superposition techniques. The accumulated error is set to zero in operation 604 before initiating the series of incremental SSN calculations in the loop including operations 606-612. In operation 606, the method selects one I/O pin whose pin or placement is changed, and the new SSN is calculated during operation 608 on IO pins, taking into account the new setting or placement of the pin and results from previous SSN calculations.

Figure 8:
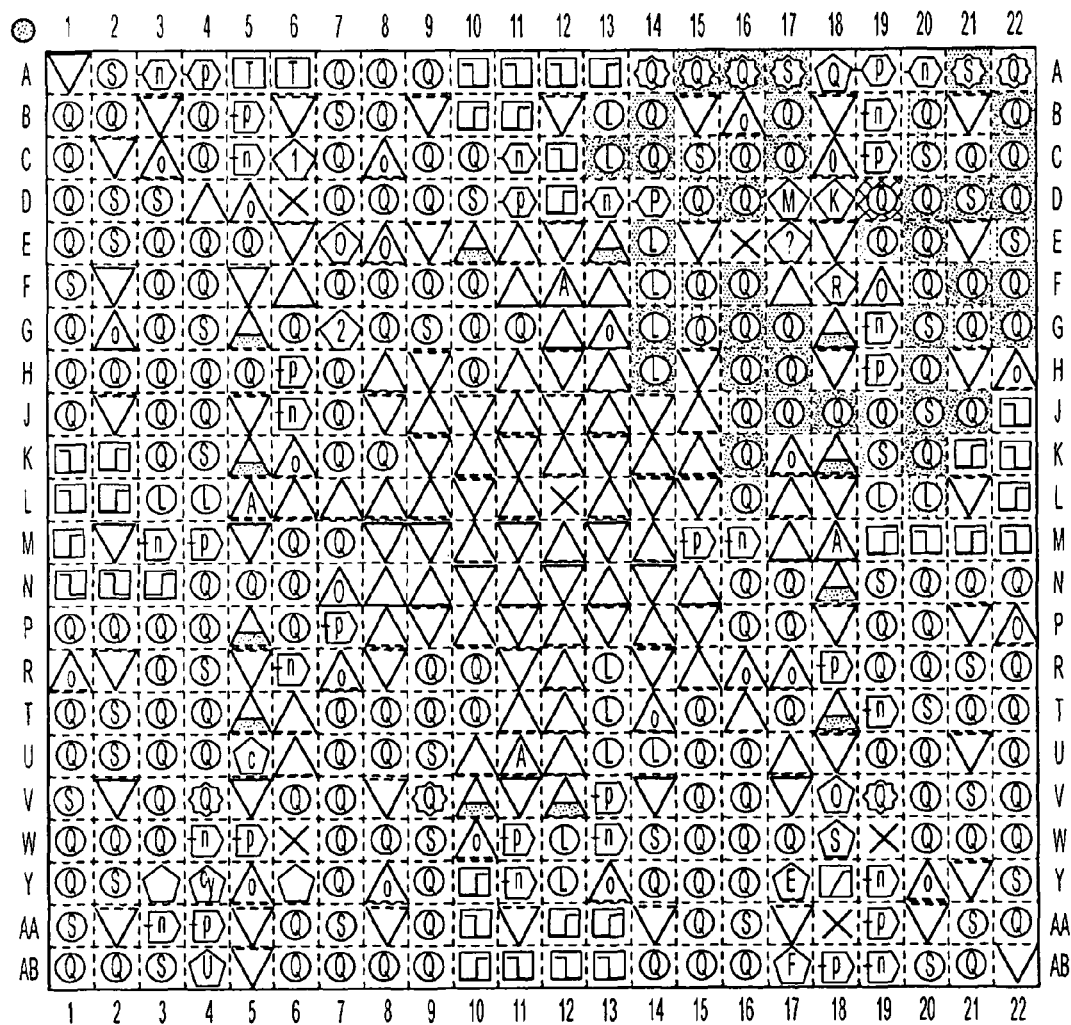
FIG. 8 is a graphical representation of calculated SSN for the pins of an electronic component according to one embodiment.

The error introduced in operation 608 due to the incremental SSN of operation 610 is added to the error tally kept in the accumulated error count. A decision is made in operation 612 to check weather a design criteria as been met or weather the accumulated error has passed the maximum threshold error. The design criteria can be set by the user or programmatically, and is often based on the maximum amount of SSN noise allowed for the pins in the IO. In one embodiment, the results of the SSN simulation are shown in graphical form, as seen in FIG. 8. The graphical representation allows the user to quickly identify if the SSN calculated is acceptable or if further changes are required to improve the SSN on pins. If a design criterion is met or if the maximum error has been reached, the method continues to operation 616, otherwise the method loops back to operation 606.

The design criteria is checked in operation 616, and if the design criteria is not met then method continues first to operation 614 where a new full signoff SSN on IO pins is run, and then back to operation 604. If the design criteria is met, the method flows to operation 618 where the results from the simulations are used to select the best SSN from all the ones calculated and the configuration associated with the best SSN is selected to create a design for the IC. The IC design can be used to program the IC as seen in FIG. 1. In one embodiment (not shown), a new full SSN calculation is performed on the configuration corresponding to the best SSN to get an accurate representation of the SSN. The user has the option to return to operation 604 and continue improving the IO pin design using incremental changes to the design.

Figure 7:
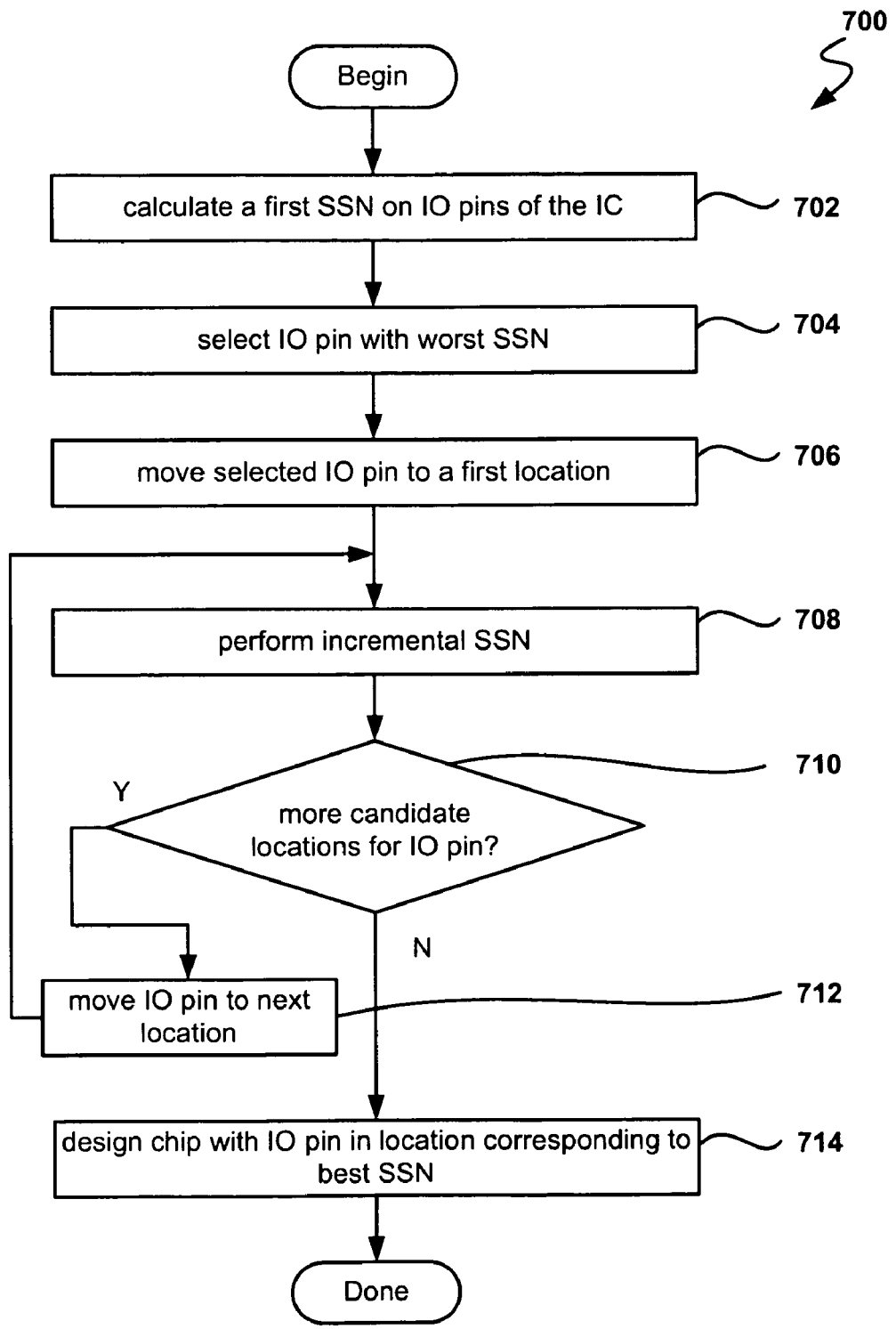
FIG. 7 includes a flow chart for programmatically selecting a modification to a circuit design that improves SSN on IO pins according to one embodiment.

FIG. 7 includes flow chart 700 for programmatically selecting a modification to a circuit design that improves SSN on IO pins according to one embodiment. Embodiments of the invention allow for interactivity between a user and an SSN estimation program to perform small changes and obtain quick new SSN estimates. Obtaining fast incremental SSN calculations allows the development of heuristic processes to programmatically change settings or placements of pins and check whether the SSN situation improves or worsens. A computer program can thus perform a few simulations and offer suggestions to the user for improved pin location.

One method for automating this process is described in flow chart 700. The person skilled in the art with access to this disclosure will readily appreciate modifications to this method in order to programmatically obtain enhanced SSN configurations.

In operation 702 the first SSN is calculated. A pin is selected in operation 704 with the worst SSN. Different embodiments use different criteria for defining the worst SSN. For example, the worst SSN can correspond to a maximum SSN value on the pins or can correspond to the highest deviation of the SSN on a pin with respect to a maximum SSN specified for such pin.

In operation 706, the selected pin in operation 704 is moved to a new location. The new location can be determined at random, or can correspond to an unused pin, or can correspond to the location of another pin with a low SSN value, or can be just one location from a list of locations that the program will test, etc.

The incremental SSN after the pin change is calculated in operation 708. Operation 710 determines if there are more candidate locations for the selected pin, and if this is the case, the method flows to operation 712 where the pin is moved to the next candidate location and then flows back to operation

708 for a new iteration. If the list of candidates is exhausted the method flows to operation 714, where a design is created corresponding to the best SSN of the calculated SSNs.

FIG. 8 is graphical representation of calculated SSN for the pins of an electronic component according to one embodiment. In this embodiment, a matrix representation of the different I/O pins on the device shows the level of noise at different pins by using different colors and shading intensity. In this example, SSN is more intense on the pins in the top right corner, thereby suggesting a relocation of some of these I/O pins to different physical locations in the electronic component to decrease the interference of aggressor pins. This representation is shown as way of example, but other representations are possible using different layouts, icons, colors, shadings, etc., as long as the functionality described herein is maintained. The representation can be shown on a monitor for a user.

Figure 9:
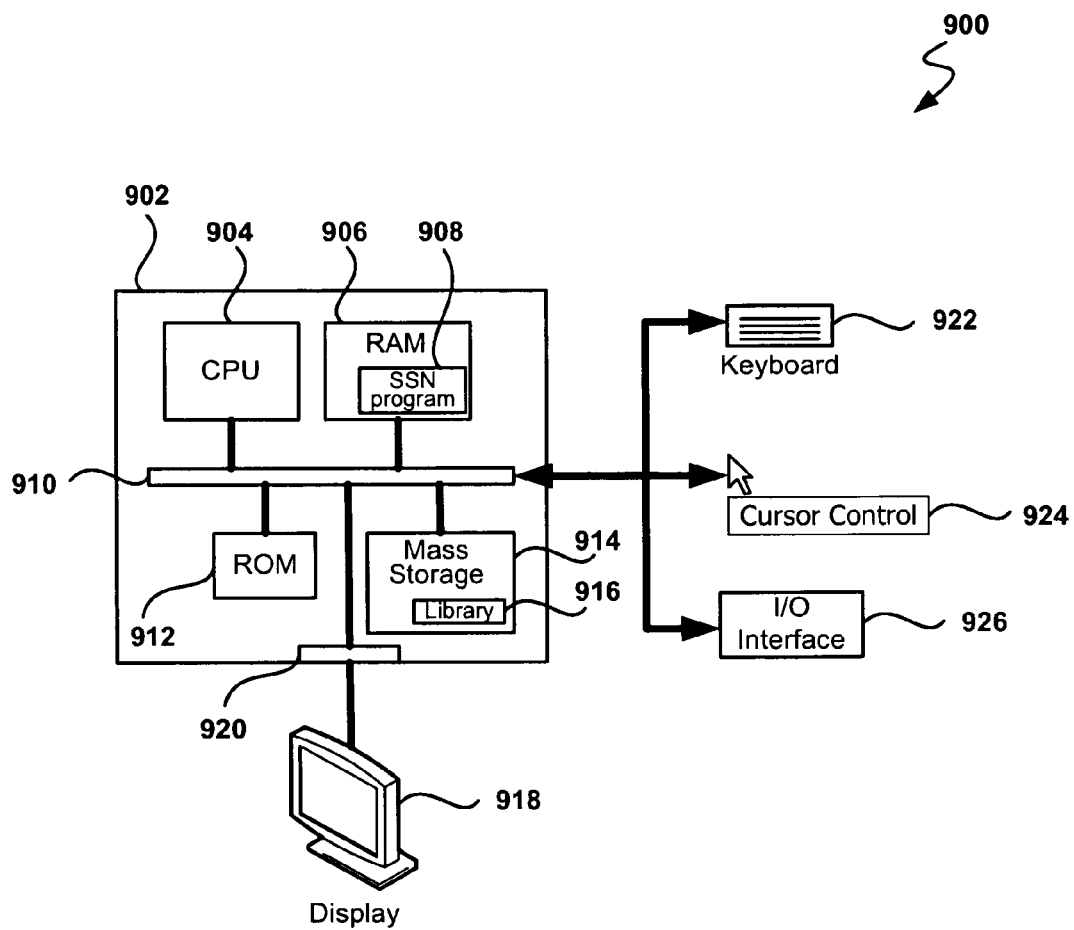
FIG. 9 is a simplified schematic diagram of a computer system for implementing embodiments of the present invention.

FIG. 9 is a simplified schematic diagram of computer system 900 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 9 may be used to calculate SSN. The computer system includes a central processing unit (CPU) 904, which is coupled through bus 910 to random access memory (RAM) 906, read-only memory (ROM) 912, and mass storage device 914. SSN simulation program 908 resides in random access memory (RAM) 906, but can also reside in mass storage 914.

Mass storage device 914 represents a persistent data storage device such as a floppy disc drive or a fixed disc drive, which may be local or remote. SSN simulation model 916 resides in mass storage device 914, but can also reside in RAM 906 during processing. Model 916 may contain circuit models for SSN calculations. It should be appreciated that CPU 904 may be embodied in a general-purpose processor, a special purpose processor, or a specially programmed logic device. Display 918 is in communication with CPU 904, RAM 906, ROM 912, and mass storage device 914, through bus 910 and display interface 920. Of course, display 918 is configured to display the user interfaces described herein. Keyboard 922, cursor control 924, and input/output interface 926 are coupled to bus 910 in order to communicate information in command selections to CPU 904. It should be appreciated that data to and from external devices may be communicated through input output interface 926.

The methods computer programs and systems for designing and IC using SSN estimations, described herein may be incorporated into any suitable integrated circuit. For example, the methods, computer programs and systems may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), application-specific integrated circuit (ASIC) just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for designing an electronic component, the method comprising:

calculating a first Simultaneous Switching Noise (SSN) on Input/Output (IO) pins with a first configuration of the electronic component;

changing one of a setting or a placement of a first IO pin to obtain a second configuration of the electronic component;

obtaining a second SSN on each IO pin other than the first IO pin by,
 starting with the first SSN on each IO pin,
 subtracting an SSN caused by the first IO pin from the first SSN, and
 adding an incremental SSN caused by the first IO pin on each pin in the second configuration to the first SSN; and creating a design for the electronic component with one of the first or the second configuration based on the first and the second SSN, wherein at least one operation of the method is executed through a processor.

2. The method as recited in claim 1 further including:
repeating changing one of the setting or the placement to obtain subsequent SSNs based on previous SSNs until one of a design criteria is met or an accumulated error for a last calculated SSN exceeds a predetermined maximum.

3. The method as recited in claim 1, wherein the changing occurs prior to the obtaining.

4. The method as recited in claim 1 further including:
estimating an SSN for the first IO pin with the second configuration.

5. The method as recited in claim 1, wherein calculating the first SSN includes:
calculating SSN on a second IO pin by adding a direct current (DC) noise and a term for each of the IO pins other than the second IO pin, the term being calculated as noise induced on the second IO pin by a corresponding IO pin when the corresponding IO pin is switching and all other IO pins are quiet.

6. The method as recited in claim 1, wherein adding the incremental SSN includes:
adding an SSN noise when the first IO pin is switching and all other IO pins are quiet.

7. The method as recited in claim 5, wherein the term represents a waveform of noise induced on the second IO pin.

8. The method as recited in claim 5, wherein changing one of the setting or the placement of the first IO pin includes:
switching the placement of the first IO pin with a placement of a third IO pin, wherein obtaining the second SSN includes accounting for changes due to the switching of the placement.

9. The method as recited in claim 1, wherein creating the design includes:
creating the design for the electronic component with the first configuration when the first SSN is less than the second SSN; and
creating the design for the electronic component with the second configuration when the first SSN is greater than the second SSN.

10. A computer program embedded in a non-transitory computer-readable storage medium, when executed by one or more processors, for designing an integrated circuit (IC), the computer program comprising:
program instructions for calculating a first simultaneously switching noise (SSN) on IO pins of the IC;
program instructions for selecting a first IO pin from the IO pins for changing a placement of the first IO pin;
program instructions for calculating a second SSN on the IO pins based on the changing the placement of the first IO pin and based on the first SSN;
program instructions for tracking an amount of error for the second SSN;
program instructions for repeating the changing and the calculating until a design criteria is met or until a threshold error is reached; and
program instructions for creating a design for the IC by selecting a lowest value SSN from all calculated SSNs.

11. The computer program as recited in claim 10, wherein the program instructions for selecting the first IO pin includes:
program instructions for enabling a user to select the first IO pin.

12. The computer program as recited in claim 10, wherein the selecting of the first IO pin as an IO pin is based on a highest deviation of SSN over a design requirement in the first SSN.

13. The computer program as recited in claim 10, wherein tracking the amount of error is associated with an error source resulting from noise change in the IO pins, a number of aggressor pins, a distance to aggressor pins, IO standards, a maximum number of IO pin moves, or a connectedness of the physical medium.

14. The computer program as recited in claim 10, wherein the program instructions for calculating the second SSN include:
program instructions for adjusting drive strength of the IO pins.

15. The computer program as recited in claim 10, wherein the program instructions for calculating the second SSN include:
program instructions for adjusting slew rate of the IO pins.

16. A method comprising:
calculating a first simultaneous switching noise (SSN) on IO pins of an IC;
selecting a first IO pin from the IO pins of the IC;
changing a placement of the first IO pin from a first location to a new location in the IC;
calculating a second SSN on the IO pins using the first SSN; and
creating a design for the IC with the first IO pin in the new location in response to the second SSN being lower than the first SSN and in the first location in response to the first SSN being lower than the second SSN, wherein at least one operation of the method is executed through a processor.

17. The method of claim 16, wherein calculating the second SSN includes:
scaling noise on SSN waveforms to account for impedance changes.

18. The method of claim 16, wherein calculating the second SSN includes:
increasing far end capacitive loading on the IO pins to filter SSN.

19. The method of claim 16, wherein calculating the second SSN includes:
increasing error associated with the second SSN based on impedance changes on third-party IO pins.

20. The method of claim 16, wherein calculating the second SSN includes:
assigning a temporary SSN to the first IO pin when an SSN of the new location was not tracked in the first SSN.

* * * * *